(12) United States Patent
Fox (10) Patent No.: US 6,408,246 B1
(45) Date of Patent: Jun. 18, 2002

(54) REMOTE TERMINAL LOCATION ALGORITHM

(75) Inventor: Brian L. Fox, Colorado Springs, CO (US)

(73) Assignee: Xircom Wireless, Inc., Colorado Springs, CO (US)

( * ) Notice: Subject to any disclaimer, the term of this patent is extended or adjusted under 35 U.S.C. 154(b) by 0 days.

(21) Appl. No.: 09/691,451

(22) Filed: Oct. 18, 2000

(51) Int. Cl.[7] .............................. G06F 17/10; G06F 7/78
(52) U.S. Cl. .................. 701/300; 701/207; 342/357.01; 342/357.02
(58) Field of Search ................................. 701/207, 216, 701/300; 342/357.01, 357.02, 458, 463, 464, 465; 455/67.1, 456

(56) References Cited

U.S. PATENT DOCUMENTS

| | | | | |
|---|---|---|---|---|
| 5,884,221 A | * | 3/1999 | Wortham | 701/300 |
| 5,926,133 A | * | 7/1999 | Green, Jr. | 342/363 |
| 6,035,202 A | * | 3/2000 | Camp, Jr. | 455/456 |
| 6,266,534 B1 | * | 7/2001 | Raith et al. | 455/456 |
| 6,282,427 B1 | * | 8/2001 | Larsson et al. | 455/456 |

* cited by examiner

Primary Examiner—Gertrude Arthur
(74) Attorney, Agent, or Firm—Blakely, Sokoloff, Taylor & Zafman LLP (57) ABSTRACT

The accuracy of location estimates based on time-of-arrival measurements may be improved using a variety of different approaches. In some approaches, accuracy predictions are made before a location estimate is computed, and the location estimate is only computed when a high accuracy is predicted. In other approaches, a plurality of preliminary location estimates are computed, and the accuracy of each preliminary estimate is determined. A final location estimate is then based on the preliminary location estimates with the best determined accuracy. In some approaches, the accuracy predictions and determinations are based on geometric dilution of precision (GDOP) or a known topography of a region. In another approach, a subset of time-of-arrival measurements is fed into a closed-form algorithm to produce a preliminary location estimate. This preliminary location estimate is then used to initialize an open-form location algorithm. Optionally, more than one of these approaches may be combined.

14 Claims, 7 Drawing Sheets

REMOTE TERMINAL LOCATION ALGORITHM

FIELD OF THE INVENTION

The field of the present invention relates to location services. More particularly, the field of the present invention relates to locating a mobile device by noting times of arrival of signals that travel between the mobile device and a plurality of transmitters or receivers located at known positions, and computing a location based on the noted times of arrival.

BACKGROUND OF THE INVENTION

Recently, the FCC mandated the introduction of location services that can accurately locate wireless subscribers on all wireless networks. Two previously proposed approaches for implementing such location services are the uplink time-of-arrival approach (referred to herein as "uplink") and the downlink time-of-arrival approach (commonly known as observed time difference or OTD, and referred to herein as "downlink").

In the uplink approach, the mobile device (also referred to as a "handset" or "remote terminal") that is to be located sends out a signal. For example, in the context of a GSM system (global system for mobile communication), this signal could be a random access channel (RACH) burst. In other contexts, other signals that are transmitted by the handset may be used. The time of arrival (TOA) of the signal is determined at each of a plurality of location measurement units (LMUs), together with an associated indicator ($\sigma$) that describes the quality of the TOA measurement. Each of these noted TOAs and $\sigma$s is then sent to a computer. The computer then uses conventional algorithms, which are well known to those skilled in the art, to determine the location of the mobile device based on the TOA and $\sigma$ determinations made by the LMUs and the known location of the LMUs.

One suitable conventional location algorithm uses a Taylor search to locate the intersection of two or more hyperbolas. Details of a such an algorithm can be found in "Statistical Theory of Passive Location Systems" by D. J. Torrieri, IEEE Transactions on Aerospace and Electronic Systems, Vol. AES-20, No. 2, March 1984, which is incorporated herein by reference and is an indication of the existing level of skill in the art. This algorithm locates the mobile device based on three or more TOA readings (which are used to determine the distance from the mobile device to the LMU based on the speed c of the signal), the associated $\sigma$s, and the known locations of each LMU. When four or more TOA readings are available, this algorithm can locate the mobile device in three-dimensional space.

In the downlink approach, each of a plurality of base stations (BTSs) sends a signal to the mobile device to be located, and the mobile device determines the TOA and $\sigma$ of each of these signals. These TOAs and $\sigma$s are then transmitted to a remote computer, which implements a conventional algorithm to determine the mobile device's location based on the TOAs and $\sigma$, similar to the uplink type systems. Alternatively, if sufficient processing power is available in the handset, the algorithm may be implemented in the handset. When the transmission frames of the BTSs are not synchronized, the downlink algorithms are somewhat more complex because the computer must obtain the relative time difference between each BTS transmission to calculate a location. This relative time information can be obtained using auxiliary receivers located at known locations to measure the TOAs of the signals from the BTSs, in a conventional manner.

In both uplink and downlink systems, three TOA measurements are sufficient to form a location estimate in two-dimensional space (e.g., on the surface of the earth, by assuming sufficient flatness). The accuracy of the location estimate, however, is limited by the resolution and accuracy of the TOA measurements, as well as by noise, interference, and multipath distortion that can corrupt the TOA measurements.

Using more than three TOAs (e.g., using 4–7 TOAs) to form the location estimate can provide improved accuracy, as compared to estimates based on only three TOAs. Unfortunately, in order to include additional TOA measurements, it is often necessary to rely on TOA readings with poor quality communication links. The poor quality of these communication links can counteract some or all of the benefits provided by the additional TOA measurements. In certain circumstances, a location estimate based on four or more TOA measurements may be even worse than an estimate based on only three TOA measurements.

The inventor has recognized a need to improve the accuracy of computed location estimates.

SUMMARY OF THE INVENTION

The present invention relates to forming more accurate location estimates by basing the estimates on a good set of TOA measurements.

One aspect of the present invention is directed to a method of locating a mobile device. In this method, a plurality of TOA measurements for communications between the mobile device and at least four fixed stations are obtained, and subsets of these TOA measurements are identified. Then, the accuracy for a location estimate corresponding to each of the identified subsets is predicted. At least one of the subsets is selected based on the predicted accuracy, and a location estimate is formed based on the selected subset or subsets.

Another aspect of the present invention is directed to a method of locating a mobile device. In this method, a plurality of TOA measurements for communications between the mobile device and at least four fixed stations are obtained, and subsets of these TOA measurements are identified. Then, a preliminary location estimate is formed for each subset and an accuracy is determined for each preliminary location estimate. At least one of the preliminary location estimates is selected based on the determined accuracy, and a final location estimate is formed based on the selected preliminary location estimate or estimates.

Another aspect of the present invention is directed to a method of locating a mobile device. In this method, a plurality of TOA measurements are obtained. A geometric dilution of precision (GDOP) of an expected solution geometry for subsets of these TOA measurements is predicted based on (a) an estimate of a location of the mobile device and (b) known locations of fixed stations corresponding to the TOA measurements. A subset of TOA measurements is selected based on the GDOP predictions, and a location estimate is computed based on the TOA measurements in the selected subset.

Another aspect of the present invention is directed to a method of locating a mobile device. In this method, a plurality of TOA measurements are obtained, and a plurality of subsets of these TOA measurements are identified. A preliminary location estimate is computed for each of the identified subsets, and a GDOP of a solution geometry is determined for each preliminary location estimate. This GDOP is determined based on (a) the respective preliminary location estimate and (b) known locations of fixed stations corresponding to the TOA measurements that were used to form each preliminary location estimate. Based on the determined GDOPs, a particular subset of TOA measurements is selected. A location estimate is then computed based on the TOA measurements in the selected subset.

Another aspect of the present invention is directed to a method of locating a mobile device. In this method, at least four TOA measurements are obtained. A subset of three of these TOA measurements is selected. Based on this subset, a preliminary location estimate is formed using a closed-form algorithm. A final location estimate is then computed using an open-form algorithm, using the preliminary location estimate to initialize the open-form algorithm.

DETAILED DESCRIPTION OF THE PREFERRED EMBODIMENTS

Figure 1:
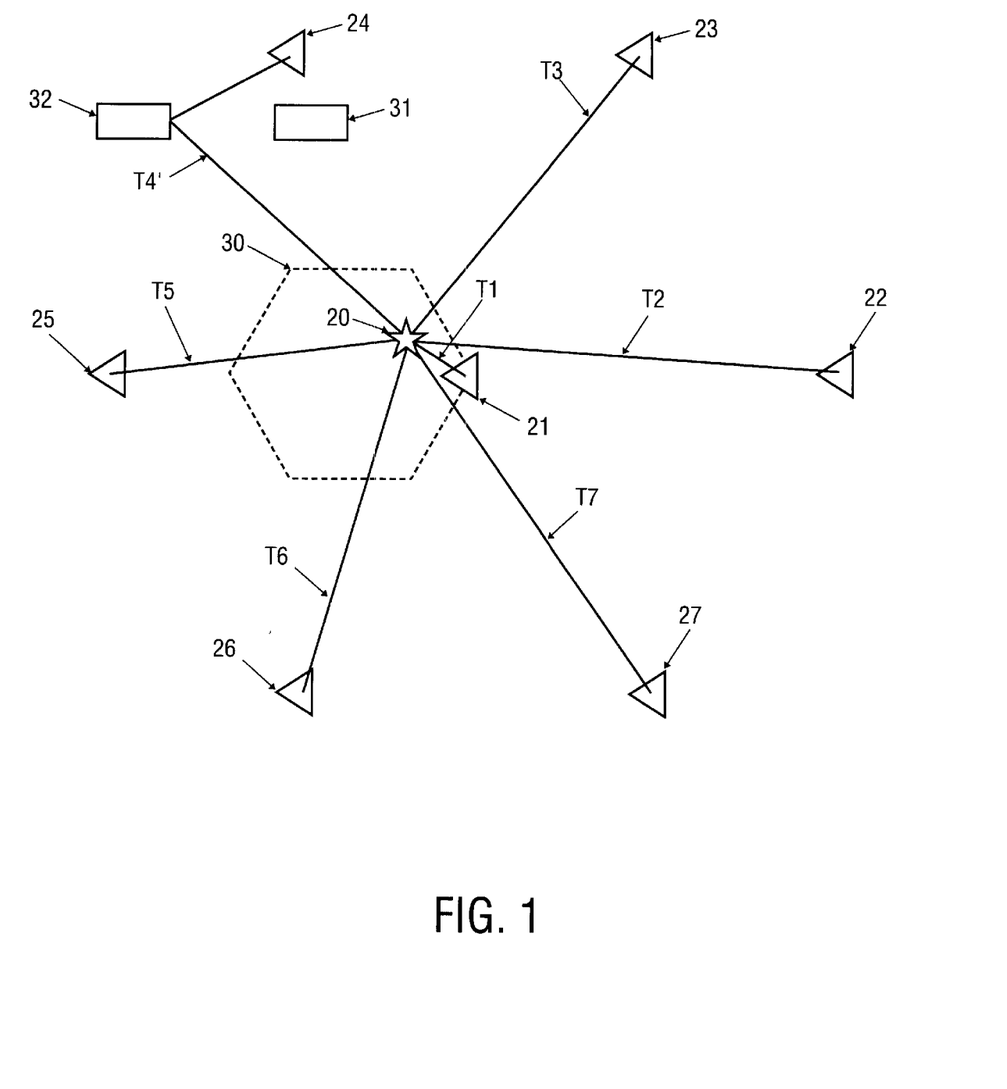
FIG. 1 is a schematic illustration of a mobile device to be located, a plurality of LMUs in an uplink system, and the signal paths therebetween, with multipath in one of the signal paths.

FIG. 1 illustrates a system with a mobile device 20 that is to be located based on the mobile device's communications with a plurality of fixed stations. These fixed stations are preferably permanently fixed to the earth at known reference locations, but may also be temporarily fixed in position (e.g., on a truck at a known reference location). In a preferred embodiment, the mobile device 20 is a cellular telephone that is located within a particular cell 30.

In uplink systems, the fixed stations are preferably LMUs 21–27 that are located in the general vicinity of the mobile device 20, and possibly colocated with adjacent base station sites. It takes the signal a certain time to travel from the mobile device 20 to each of the LMUs 21–27, based on the distance and the speed of light. The times of travel T1–T7 are labeled for each respective signal path to a LMU 21–27. When the signals arrives at their destination, a time of arrival (TOA) and a quality indicator σ is determined by the LMU 21–27 for each signal. The conventional quality indicator C provides an estimate of the standard deviation of the TOA measurement.

The signals from the LMUs 21–23 and 25–27 travel to the mobile device 20 in straight lines, and each of the times T1–T3 and T5–T37 is directly proportional to the straight-line distance between the mobile device 20 and the respective LMU. The signal path from the mobile device 20 to the LMU 24 suffers from multipath distortion because the direct signal path from the LMU 24 to the mobile device 20 is blocked by an obstacle 31 (e.g., a building or a mountain). The signal from that LMU 24 can therefore only reach the mobile device 20 by bouncing off the object 32. As a result, the time T4 is not proportional to the straight-line distance between the LMU 24 and the mobile device 20. When this type of non-proportional TOA measurement is used as the basis for a location estimate computation, accuracy of the location estimate is reduced. Similarly, when a portion of the signal from any LMU arrives at the mobile device 20 via a direct line-of-sight path, and other portions of the signal from that LMU arrive at the mobile device 20 via one or more indirect paths, the resulting signal arriving at the mobile device 20 will be dispersed with respect to a pure line-of-sight signal. This dispersion reduces the accuracy of the resulting location estimate.

In addition to multipath distortion, various other phenomena can affect the accuracy of the TOA measurements and the resulting location estimate. Examples include scenarios where the signal to noise ratio (SNR) is low, where the carrier to interference ratio (CIR) is low, or where an LMU is handling a high volume of traffic or is malfunctioning.

When a TOA measurement that has been affected by any of these problems is processed by a conventional location-estimation algorithm, the accuracy of the resulting estimate is impaired. It is therefore desirable to favor TOA measurements that have been less affected in the location estimation algorithm. Various embodiments for accomplishing this are described herein.

Figure 2:
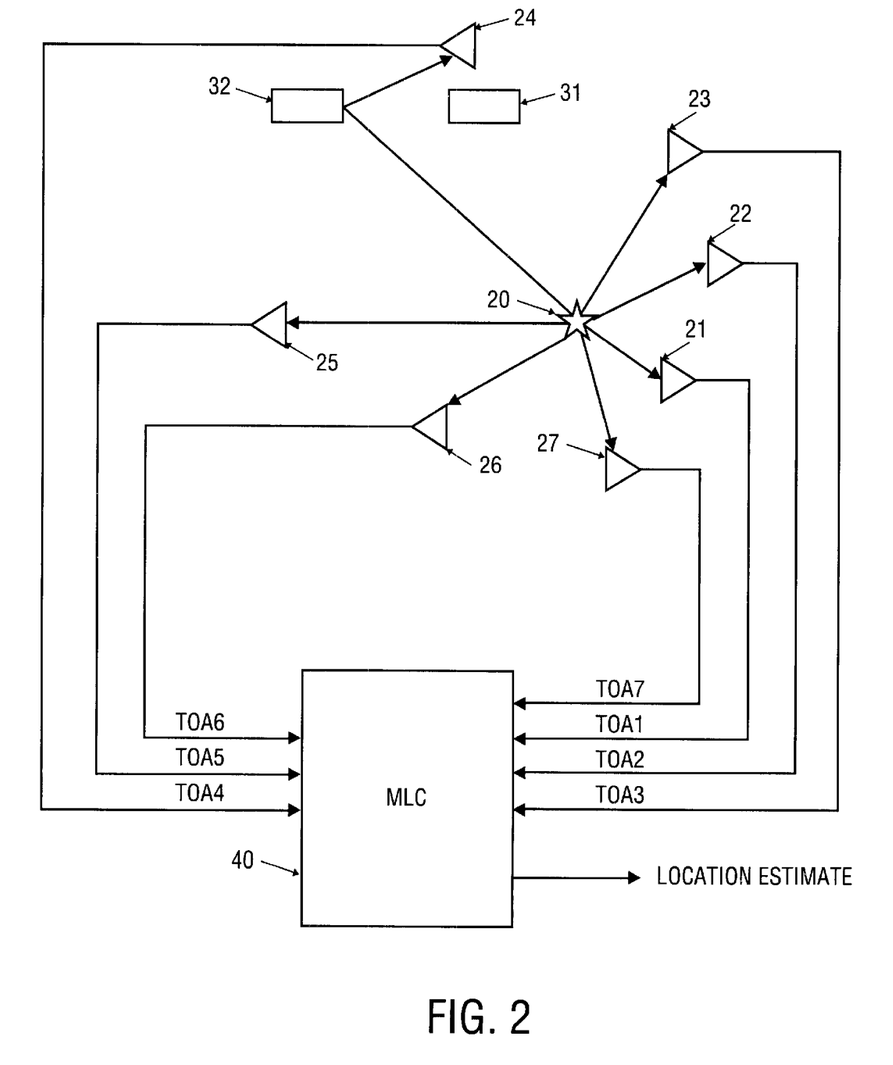
FIG. 2 is a schematic illustration of a hardware configuration for an uplink system, which provides a first context for implementing the preferred location algorithms.

FIG. 2 is an example of a suitable uplink hardware configuration which can be used to implement the algorithms described herein. In this uplink system, a mobile device sends out a signal (e.g., a RACH burst in a GSM system) that is received by a plurality of LMUs 21–27. While seven LMUs are illustrated, any number greater than four may be used. When the mobile device 20 sends out a signal, each of the LMUs 21–27 determines the TOA and σ of the signal, and forwards the TOA and C measurements to a mobile location center (MLC) 40. The TOA measurements TOA1–TOA7 and the associated a measurements may be transmitted from the LMUs 21–27 to the MLC 40 in any conventional manner, including, for example, hard-wired and wireless links. The MLC 40 is preferably a computer that is programmed to implement the location algorithms described below to determine the location of the mobile device 20.

Figure 3:
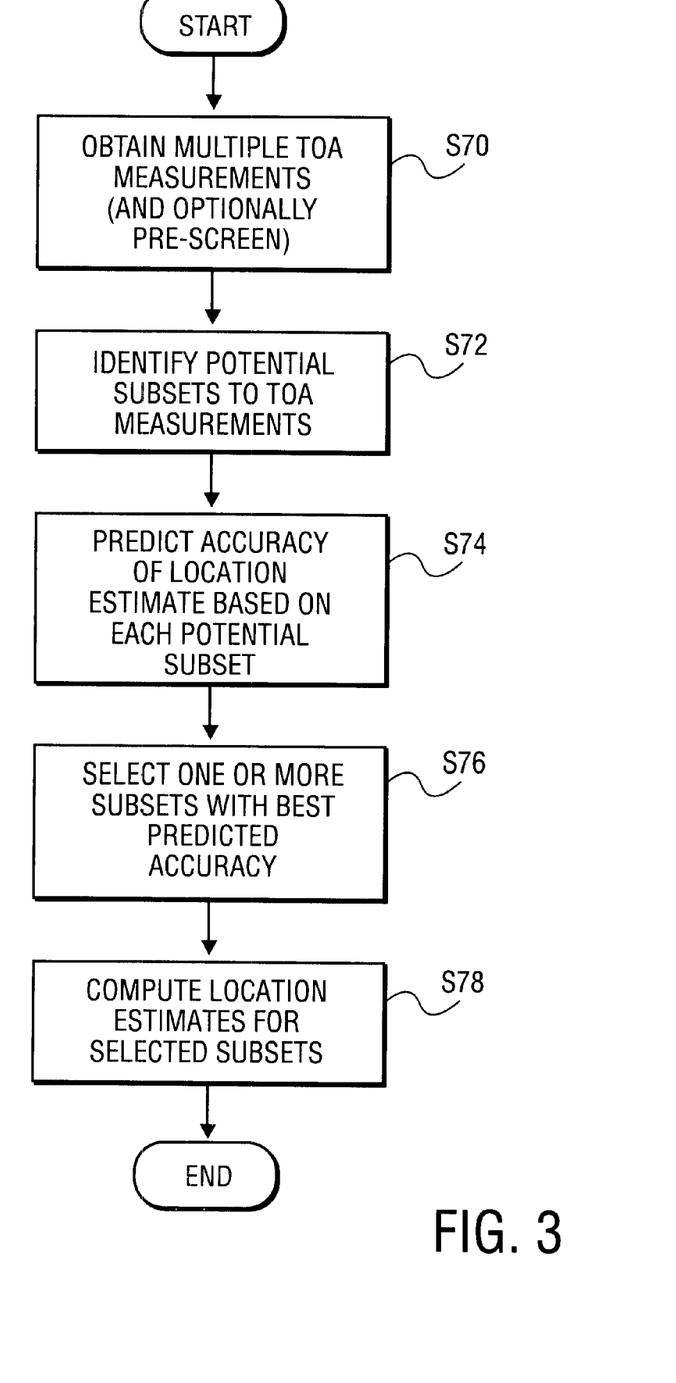
FIG. 3, is a flowchart of a first approach for creating a location estimate from a plurality of TOA measurements.

FIG. 3 is a flowchart of one preferred approach to eliminating the negative effects of poor TOA measurements that may be implemented in the MLC 40 (shown in FIG. 2). In this approach, best TOA measurements are selected for forming the location estimate before any location estimation computations are made. The determination of which particular TOA measurements should be used to form the location is made as follows:

First, in step S70, a plurality of TOA and σ measurements are obtained by the LMUs. These TOA and σ measurements may be obtained using any of a variety of techniques well known to those skilled in the art. In step S72, subsets of the TOA measurements that could be used to form a location estimate are identified. This may be accomplished, for example, by taking the TOA measurements three at a time, four at a time, five at a time, etc., to form a plurality of subsets of TOA measurements. Optionally, the TOA measurements may be pre-screened before the subsets are formed (e.g., by rejecting all TOA measurements with poor quality indicators σ).

In step S74, the accuracy of the location estimate that would be formed from each identified subset of TOA measurements is predicted, as described below. In step S76, one or more subsets of TOA measurements with the best predicted accuracy are selected. Finally, in step S78, the TOA measurements from the selected subsets are used to form a location estimate, preferably using a conventional location estimation algorithm.

The accuracy prediction for each identified subset of TOA measurements may be computed (in step S74) based on one or more of the following parameters associated with each TOA measurement in the subset: the quality indicator σ, an estimated worse-case path loss, an estimated SNR, and an estimated CIR. One example of a suitable approach for forming the accuracy prediction is to compute the sum of the squares of the as for the TOA measurements in each subset. Another example approach is to compute the average SNR or CIR for the TOA measurements in each subset (or the minimum SNR or CIR). Other examples include basing the accuracy prediction on a prior accuracy history of TOA measurements from a given LMU, or on current local measurement traffic. Numerous alternative approaches for forming an accuracy prediction may also be substituted, as will be apparent to those skilled in the relevant arts. Two or more of these approaches may also be combined.

Another way of predicting the accuracy of the location estimate for a given subset of TOA measurements is by predicting the geometric dilution of precision (GDOP) of the solution geometry for the location estimate that will eventually be formed from those TOA measurements. All other things being equal, lower GDOPs will correspond to more reliable location estimates. As a result, GDOP can be used to predict accuracy of the location estimate. In a preferred embodiment, this prediction is based on the known locations of the LMUs that provided the TOA measurements in question, plus a rough estimate of the location of the mobile device.

Figure 4:
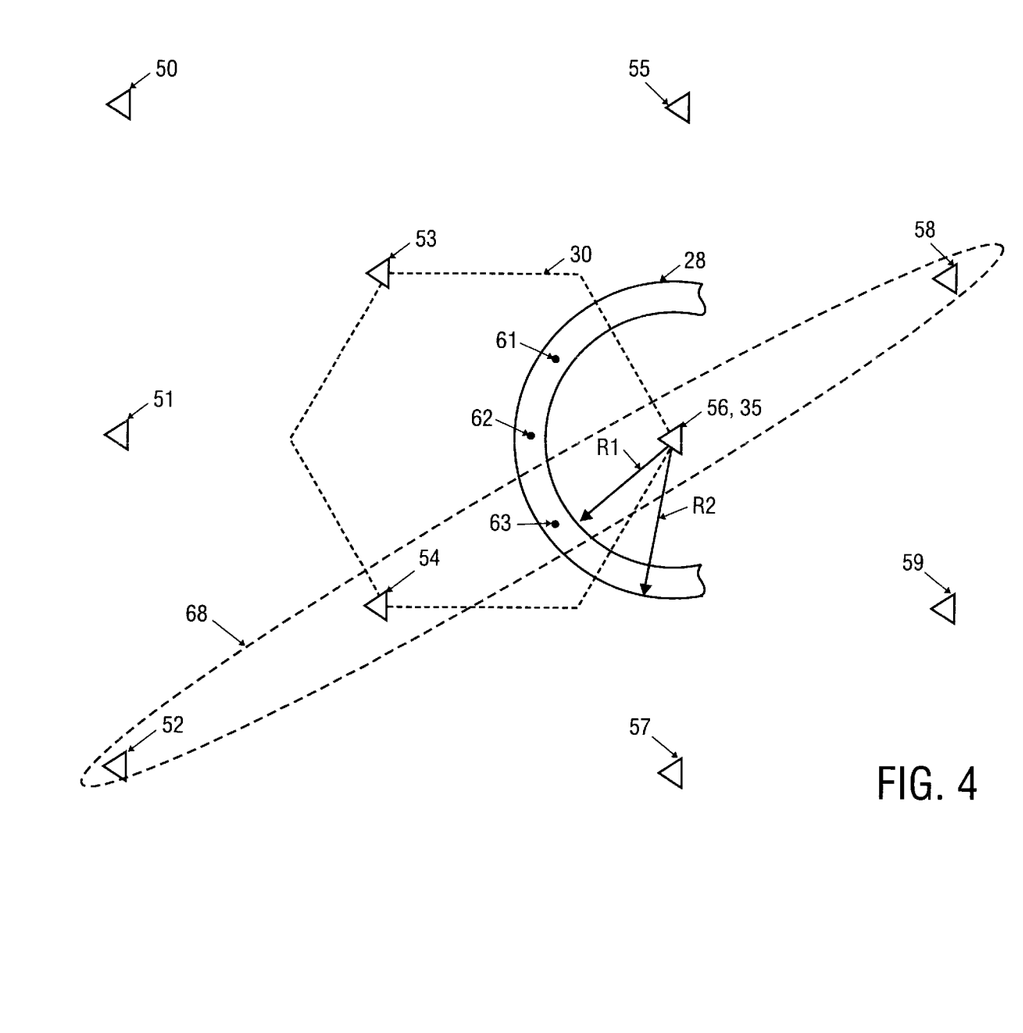
FIG. 4 is a schematic illustration of how a rough location estimate within a cell can be formed and how GDOP can be predicted.

FIG. 4 illustrates one approach for forming an accuracy prediction based on the GDOP for a rough estimate. First, a gross estimate of the location of the mobile device is formed based on which base station is currently being used to communicate with the mobile device. Assuming that the mobile device is being served by a base station 35 located near the LMU 56, this gross estimate would narrow down the location of the mobile device to somewhere within the cell 30 served by that base station 35. The mobile device's location is then narrowed down further based on a coarse estimate of the distance from the mobile to its serving base station. For example, in the context of a GSM system, the timing advance (TA) measurement may be used to estimate the propagation time of the mobile-to-base signal and the corresponding range between them. The propagation time estimate is used to form a rough estimate of the distance to the mobile device 20, bounded by an inner radius R1 and an outer radius R2 (an exact radius cannot be obtained due to noise and limited resolution). These radii R1, R2 define a region 28 centered about the serving base station 35. The portion of this region 28 that lies within the cell 30 is used as the rough estimate of the location of the mobile device 20.

This rough location estimate is then used to choose a particular subset of TOA measurements based on the predicted GDOP for each subset. In the illustrated example, locations 61, 62, and 63 each lie within the cell 30 in the region 28. As a result, if TOA measurements from LMUs 52, 54, 56, and 58 were to be used, the resulting GDOP would be poor, particularly if the mobile device is located at location 63. This poor GDOP scenario is illustrated in the dashed region 68, where the LMUs 52, 54, 56, and 58 all lie within a small angular span with respect to location 63. In this situation, moving the mobile device perpendicular to the long axis of the region 68 will have a relatively small effect on each of the TOA measurements made by LMUs 52, 54, 56, and 58, resulting in a poor GDOP (and a correspondingly poor accuracy prediction in step S74 of FIG. 3).

In contrast, if TOA measurements from LMUs 53, 54, 55, and 57 are used, the resulting GDOP would be good no matter where the mobile device is located within the region 28 and the cell 30. When this set of LMUs 53, 54, 55, and 57 is selected, moving the mobile device in any direction within that region 28 will have a relatively large effect on at least some of the TOAs measured by the LMUs. The good GDOP for this set of TOA measurements translates to a good accuracy determination in step S74 of FIG. 3.

Returning now to FIG. 3, once the accuracy for each subset of TOAs has been determined (e.g., by any of the above-described approaches), one or more of the subsets with the best accuracies are selected in step S76. For example, when the accuracy determination in step S74 is based on predicted GDOP, the subsets with the best predicted GDOP are selected in step S76.

In one variation of these embodiments, only a single subset of TOA measurements is selected in step S76. A location estimate is then computed for that subset in step S78, preferably using a conventional location-estimating algorithm to process the TOA is measurements in the selected subset. In another variation of these embodiments, more than one subset of TOA measurements is selected in step S76. When this variation is implemented, a preliminary location estimate is formed from each selected subset, preferably using a conventional location-estimating algorithm. These preliminary location estimates are then merged in step S78 to form a final location estimate by, for example, selecting the mean or median X and Y positions of the preliminary location estimates, using a weighted average, or using any other suitable merging technique.

Optionally, more than one criteria may be used to determine which subset or subsets of TOA measurements should be used. For example, the predicted GDOP approach described above may be combined with a predicted accuracy based on the as for the TOA measurements by, for example, rejecting subsets with good GDOP and poor σ characteristics, and rejecting subsets with good σ characteristics and poor GDOP.

In an alternative set of embodiments, instead of predicting the accuracy of a location estimate that would result from a given set of TOA measurements before the location estimate is calculated, the subsets are used to form a plurality of preliminary location estimates, and a accuracy for each of those preliminary location estimates is subsequently determined. The best preliminary location estimate or estimates are then used to form a final location estimate. This approach can provide a higher degree of accuracy, but usually requires additional processing power.

Figure 5:
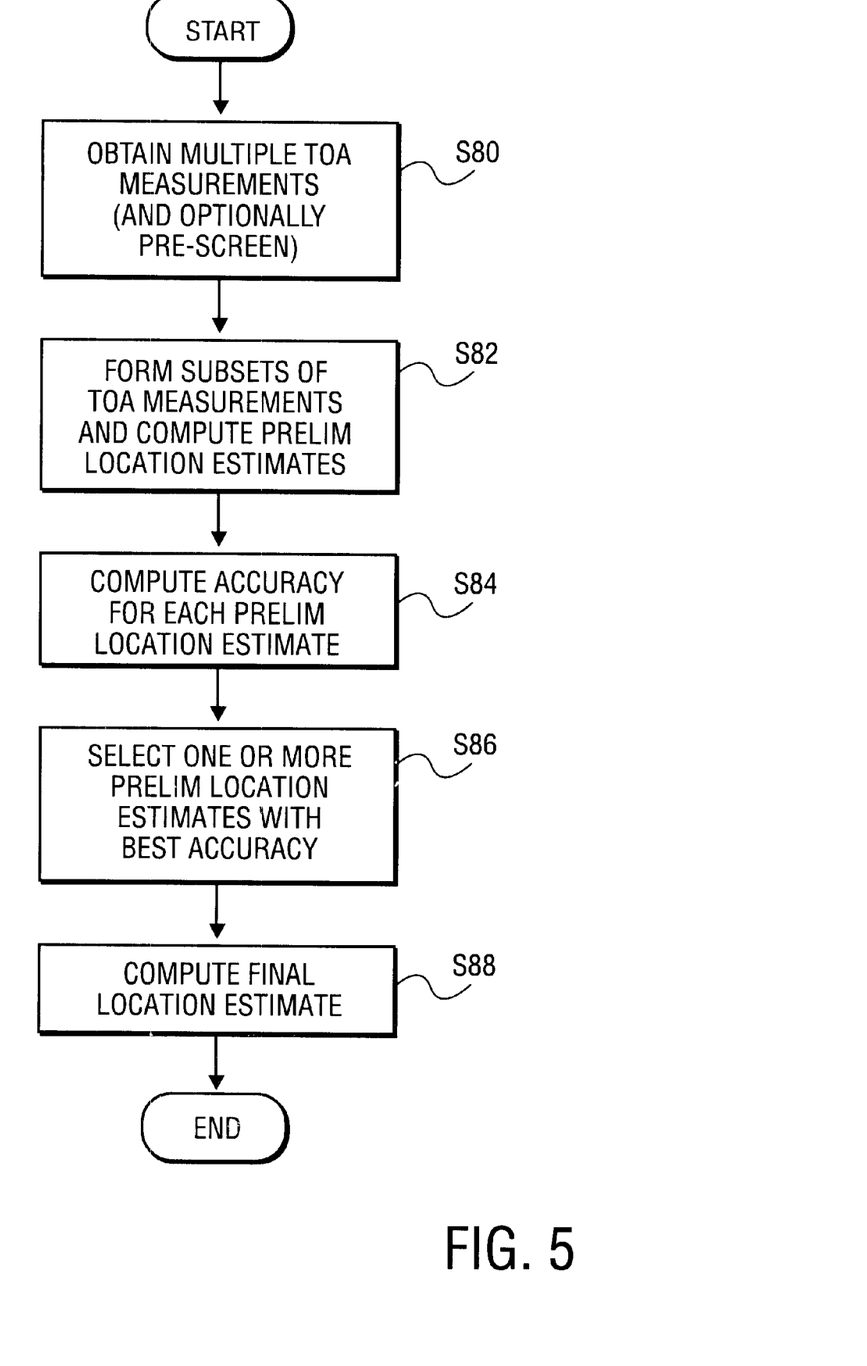
FIG. 5 is a flowchart of a second approach for creating a location estimate from a plurality of TOA measurements.

FIG. 5 is a flowchart of a preferred approach to eliminating the negative effects of poor TOA measurements that may be implemented in the MLC 40 (shown in FIG. 2). In this approach, a final location estimate is formed based on one or more preliminary location estimates. The determination of which particular preliminary location estimates should be used to form the final location estimate is determined as follows:

First, in step S80, a plurality of TOA and σ measurements are obtained by the LMUs, as described above in connection with the FIG. 3 embodiment. In step S82, subsets of the TOA measurements are identified (e.g., subsets of 3, 4, or 5 TOA measurements), and a preliminary location estimate is formed for each of these subsets (preferably using any conventional location estimation algorithm). Optionally, the TOA measurements may be pre-screened (e.g., for quality σ) before the subsets are formed.

In step S84, the accuracy of each preliminary location estimate formed in step S82 is determined, as described below. In step S86, one or more of the best preliminary location estimates is selected. Finally, in step S88, the preliminary location estimates selected in step S86 are merged to form a final location estimate.

The accuracy of each preliminary location estimate may be determined (in step 584) using any conventional accuracy estimation algorithm (e.g., based on the quality indicator σ). Alternatively, the accuracy may be determined based on an estimated worse-case path loss, an estimated SNR, an estimated CIR, or using any other appropriate approach. Two or more of these approaches may also be combined.

Another way of predicting the accuracy of each preliminary location estimate is by using known topographical information as a reality-check on the output of a three-dimensional (3D) location algorithm. In this approach, a location that has been computed in 3D space (e.g., by feeding four or more TOA measurements into a conventional 3D location algorithm such as the one described in the Torrieri article) is checked against a known topography of the area. This known topography is preferably pre-stored in a suitable format that can be accessed by the MLC 40 (shown in FIG. 2). Whenever the 3D location algorithm generates an impossible answer, a low accuracy is assigned to that answer. For example, if the computed location in 3D space has an elevation of zero feet, and that location lies beneath a 2000 foot high mountain, the computed location would receive a low accuracy rating. Or if a computed location is 1000 feet above the ground in a corn field (and not in a flight path), the computed location would receive a low accuracy rating.

Another way of predicting the accuracy of each preliminary location estimate is by determining the GDOP of the solution geometry for each preliminary location estimate. This may be accomplished by comparing each preliminary location estimate to the position of the LMUs that made the TOA measurements upon which the preliminary location estimate in question was based.

Figure 6:
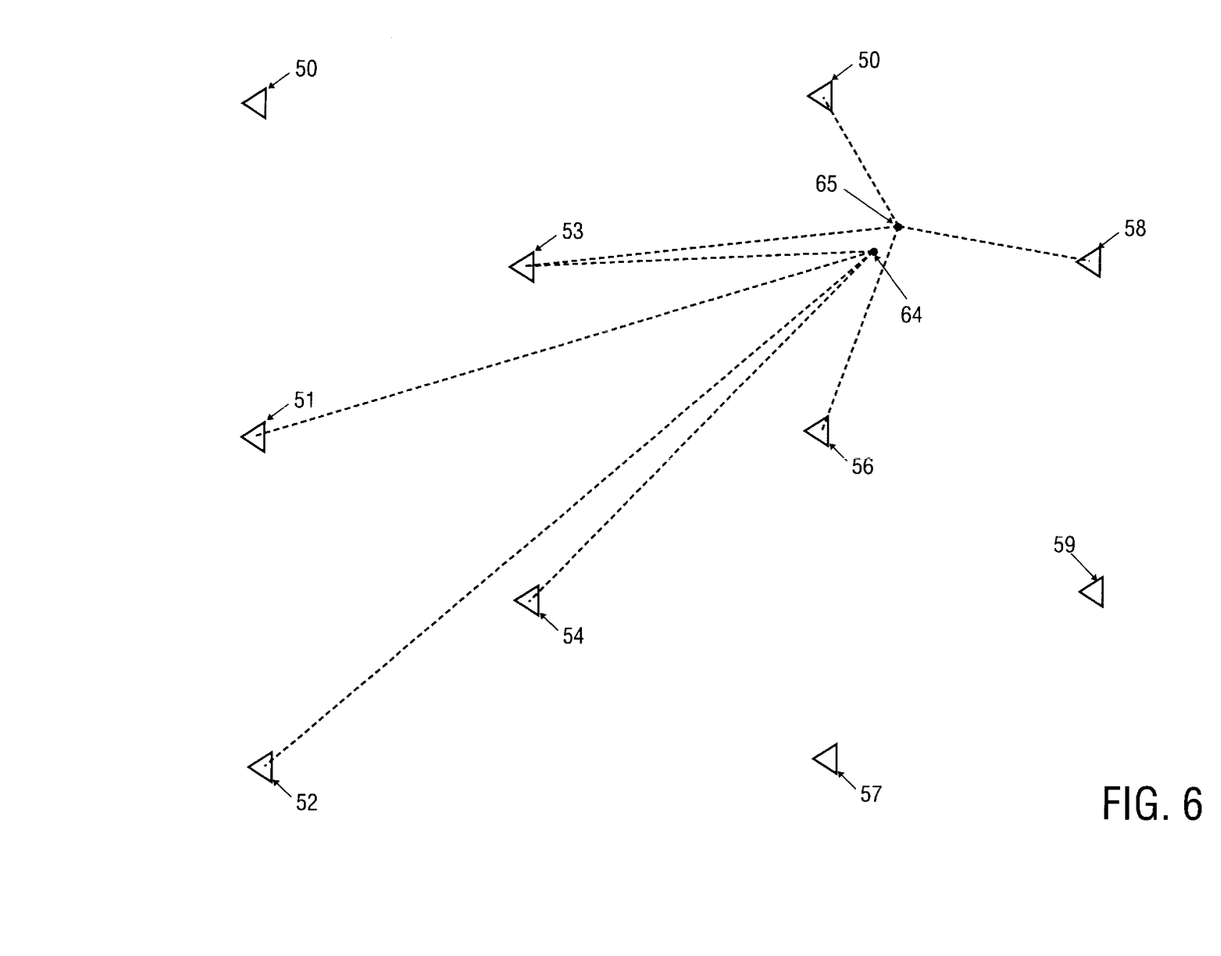
FIG. 6 is a schematic illustration of the GDOP associated with various location estimates.

For example, in FIG. 6, if a preliminary location estimate at point 64 was formed based on TOA measurements obtained from LMUs 51, 52, 53, and 54, the GDOP for that preliminary location estimate 64 would be poor (since all of the LMUs 51–54 lie within a relatively small angular span with respect to the computed position 64). This poor GDOP translates to a poor accuracy determination in step S84 of FIG. 5. In contrast, if the preliminary location estimate at point 65 was formed based on TOA measurements obtained from LMUs 53, 55, 56, and 58, the GDOP for that preliminary location estimate 65 would be good (since the LMUs 53, 55, 56, and 58 surround the computed position 65). This good GDOP translates to a good accuracy determination in step S84 of FIG. 5.

Returning now to FIG. 5, once the accuracy for each preliminary location estimate has been determined (e.g., by any of the above-described approaches), one or more of the preliminary location estimates with the best accuracies are selected in step S86. For example, when the accuracy determination in step S84 is based on predicted GDOP, the preliminary location estimates with the best GDOP would be selected.

When only a single preliminary location estimate is selected in step S86, the final location estimate is formed in step S88 based only on that single preliminary location estimate, preferably using any conventional location-estimation algorithm.

In an alternative embodiment, more than one preliminary location estimates may be selected in step 886. For example, if the accuracy determination in step S84 is based on predicted GDOP, the preliminary location estimates with the three best GDOPs might be selected. In step S88, the selected preliminary location estimates are merged by, for example, computing the mean or median X and Y locations. Optionally, the preliminary location estimates used to compute the mean may be weighted based on a calculated accuracy for each preliminary location estimate or based on the qualities of the TOAs used to form each estimate. Optionally, all preliminary location estimates that are inconsistent with a majority of the selected preliminary location estimates may be discarded. Inconsistency may be determined using any suitable technique including, for example, finding the smallest region into which a significant majority (e.g., ≧75%) of the location estimates fit, and excluding all preliminary location estimates that lie outside of that region. Optionally, a 3D reality-check may be implemented on the final location estimate (similar to the 3D reality-check described above in connection with the preliminary location estimates). Other alternative approaches for generating a final location estimate based on a plurality of preliminary location estimates may also be implemented.

After the final location estimate has been computed, the final location estimate is outputted by the MLC 40 (shown in FIG. 2).

When a preliminary location estimate is based on four or more TOA measurements, the conventional Taylor search algorithm (e.g., as described in the Torrieri article) is an open-form estimation algorithm. This type of open-form algorithm is ordinarily initialized by making an initial guess for the location of the mobile device at the center of the cell that is currently serving the mobile device. Unfortunately, this initial guess may be far enough away from the true location of the mobile device to cause the algorithm to converge at a local minimum, instead of at the true location of the mobile device.

The accuracy of location estimation algorithms may be improved by using a different initial-location guess to initialize the algorithm. In particular, the initial-location guess may be selected by feeding three TOA measurements into the conventional Taylor search algorithm (which is a closed-form least-squares estimation algorithm when only three TOA measurements are involved). Preferably the three TOA measurements used to form this initial-location guess are selected based on a predetermined criteria such as quality (σ), SNR, CIR, or a base station selection algorithm. Alternatively, the three TOA measurements used to form this initial-location guess may be selected at random. The resulting closed-form initial location guess is then used to initialize the open-form algorithm (which uses four or more TOAs to form a location estimate). This combination closed-form/open-form approach improves the convergence time of the search algorithm and reduces the likelihood of having the algorithm converge to a local minimum. In addition, the additional TOAs provide a higher degree of accuracy over location estimates based on only three TOA measurements.

By using the techniques described above, the accuracy of the resulting location estimates can advantageously be improved.

Figure 7:
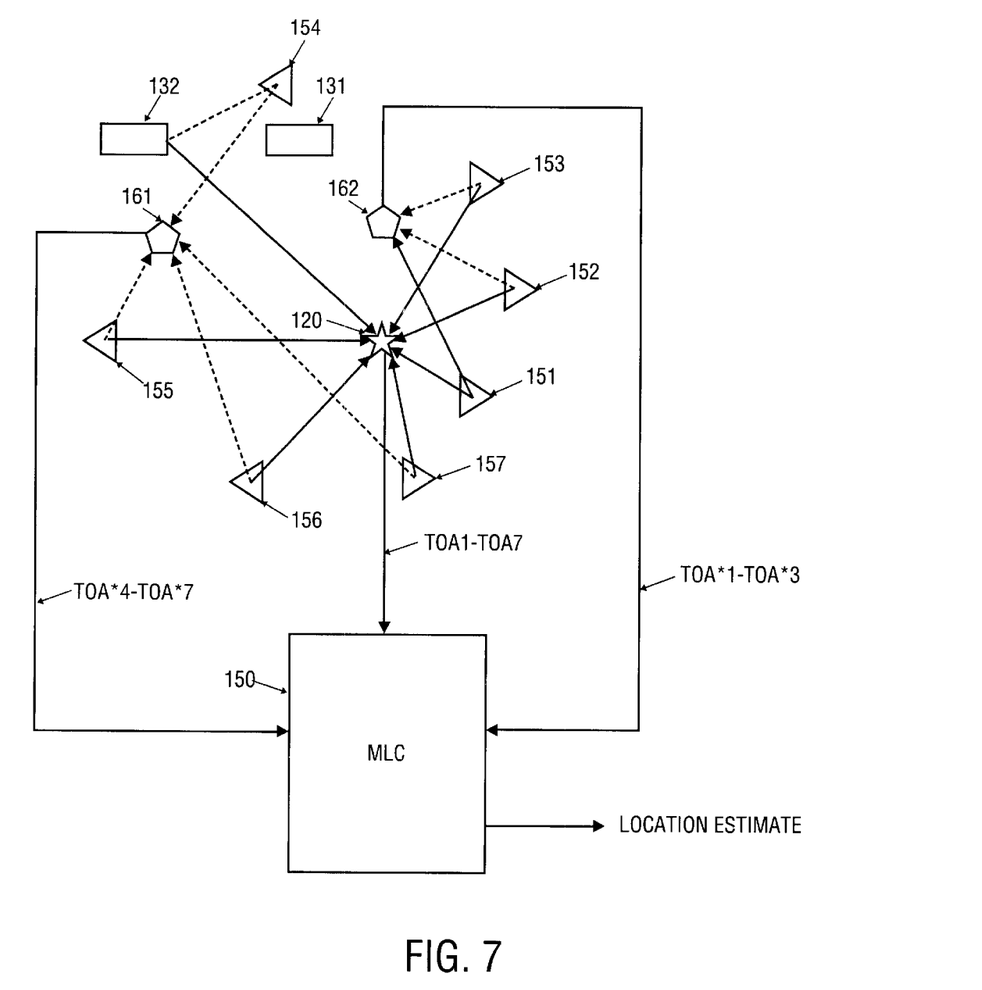
FIG. 7 is a schematic illustration of a hardware configuration for a downlink system, which provides another context for implementing the preferred location algorithms.

While the above-described algorithms are explained in the context of an uplink system, they may also be used in downlink systems, as will be apparent to skilled in the art. In downlink systems, the fixed stations are preferably base stations (BTSs) that are located in the general vicinity of the mobile device. FIG. 7 is an example of such a downlink system, where each of a plurality of BTSs 151–157 transmits signals that are received by the mobile device 120. As in the uplink system, while seven BTSs are illustrated, any number greater than four may be used. The mobile device 120 determines the TOA and σ of each of the signals arriving from a BTS, and reports the TOA measurements for those signals TOA1–TOA7 to the MLC 150, together with the σs for the TOA measurements. Auxiliary receivers 161, 162 also receive the signals from the BTSs 151–157, and the time of arrival measurements of the signals at the receivers 161, 162 is also determined. These times of arrival TOA*1–TOA*7 are also transmitted to the MLC 150. The MLC 150 uses TOA*1–TOA*7 and the known locations of each of the BTSs 151–157 to compensate for any lack of synchronization of transmission frames of the BTSs 151–157. The MLC 150 then determines a location estimate for the mobile device 120 based on the TOA measurements TOA1–TOA7 received from the mobile device 120, preferably using the algorithms described above.

While the preferred embodiments described above have been described in the context of location services for wireless networks (e.g., cellular telephones), the present invention may also be used to implement location services in other environments. For example, the algorithms described above may be used in a sonar system to locate an underwater device. Moreover, while the present invention has been explained in the context of the preferred embodiments described above, it is to be understood that various changes may be made to those embodiments, and various equivalents may be substituted, without departing from the spirit or scope of the invention, as will be apparent to persons skilled in the relevant art.

I claim:

1. A method of locating a mobile device comprising the steps of:
   obtaining a plurality of time-of-arrival measurements for communications between the mobile device and each of at least four fixed stations;
   identifying at least two subsets of the time-of-arrival measurements obtained in the obtaining step;
   forming, for each of the subsets identified in the identifying stop respectively, a preliminary location estimate based on the time-of-arrival measurements in the respective subset;
   determining an accuracy of each preliminary location estimate formed in the forming step;
   selecting at least one of the preliminary location estimates based on the accuracy determined in the determining step; and
   forming a final location estimate based on the at least one of the preliminary location estimates selected in the selecting step.

2. The method of claim 1, wherein, in the obtaining step, the communications are transmissions from the mobile device to the at least four fixed stations.

3. The method of claim 1, wherein, in the obtaining step, the communications are transmissions from the at least four fixed stations to the mobile device.

4. The method of claim 1, wherein only one preliminary location estimate having a best determined accuracy is selected in the selecting step.

5. The method of claim 1, wherein, in the determining step, the accuracy of each respective preliminary location estimate is determined based on a geometric dilution of precision (GDOP) of a solution geometry between the respective preliminary location estimate and locations of the fixed stations corresponding to the time-of-arrival measurements upon which the respective preliminary location estimate is based.

6. The method of claim 5, wherein, the accuracy of each respective preliminary location estimate is also based on a quality measurement associated with each time-of-arrival measurement upon which the respective preliminary location estimate is based.

7. The method of claim 5, wherein, the accuracy of each respective preliminary location estimate is also based on a carrier to interference ratio (CIR) or a signal to noise ratio (SNR) associated with each time-of-arrival measurement upon which the respective preliminary location estimate is based.

8. The method of claim 1, wherein, in the determining step, an accuracy of each respective preliminary location estimate is determined based on a quality measurement associated with each time-of-arrival measurement upon which the respective preliminary location estimate is based.

9. The method of claim 1, wherein, in the step of forming a preliminary location estimate for each subset, three-dimensional preliminary location estimates are formed, and
   wherein, in the determining step, the accuracy of each respective three-dimensional preliminary location estimate is determined by comparing the respective preliminary location estimate to a known three-dimensional topography, and assigning a low accuracy to impossible topographical locations.

10. A method of locating a mobile device comprising the steps of:
    obtaining a set of time-of-arrival measurements;
    identifying a plurality of subsets of the time-of-arrival measurements obtained in the obtaining step;
    computing a preliminary location estimate for each of the subsets identified in the identifying step;
    determining a geometric dilution of precision (GDOP) of a solution geometry for each respective preliminary location estimate based on (a) the respective preliminary location estimate and (b) known locations of fixed stations corresponding to each of the time-of-arrival measurements in a subset from which the respective preliminary location estimate was formed;
    selecting a particular subset of time-of-arrival measurements based on the GDOP determined in the determining step for each of the preliminary location estimates; and
    computing a location estimate based on the time-of-arrival measurements contained in the subset selected in the selecting step.

11. The method of claim 10, wherein the obtaining step comprises the step of noting a time-of-arrival of a signal from the mobile device at each of the fixed stations.

12. The method of claim 10, wherein the obtaining step comprises the step of noting a time-of-arrival at the mobile device for each of a plurality of signals arriving from the fixed stations.

13. The method of claim 10, wherein, in the selecting step, the selection of the particular subset is also based on a quality for the time-of-arrival measurements in at least one of the subsets.

14. The method of claim 10, wherein, in the selecting step, the selection of the particular subset is based on the GDOP of the particular subset being lower than the GDOP of other subsets.

* * * * *